United States Patent [19]

Goodwin

[11] 4,373,005
[45] Feb. 8, 1983

[54] INSULATION MATERIAL

[75] Inventor: John D. Goodwin, Vivian, La.

[73] Assignee: Inventure, Inc., Shreveport, La.

[21] Appl. No.: 263,169

[22] Filed: May 13, 1981

[51] Int. Cl.³ .................. B32B 19/00; C04B 43/00; C04B 31/00
[52] U.S. Cl. ................................ 428/357; 106/75; 252/62; 428/402; 428/364; 428/372; 428/317.9
[58] Field of Search ............... 106/75; 252/62; 428/402, 364, 357, 283, 372, 311.1, 311.5, 317.9

[56] References Cited

U.S. PATENT DOCUMENTS

| | | | |
|---|---|---|---|
| 3,025,202 | 3/1962 | Morgan et al. | 428/317.9 |
| 3,952,830 | 4/1976 | Oshida et al. | 252/62 |
| 4,190,547 | 2/1980 | Mahnke et al. | 252/62 |
| 4,203,773 | 5/1980 | Temple et al. | 106/75 |

*Primary Examiner*—William R. Dixon, Jr.
*Attorney, Agent, or Firm*—Bernard A. Reiter

[57] ABSTRACT

Disclosed is an improved insulation material which comprises a substantially homogeneous mixture of inorganic, non-flammable, fibrous material and discrete particles of expanded amorphous glass.

7 Claims, 1 Drawing Figure

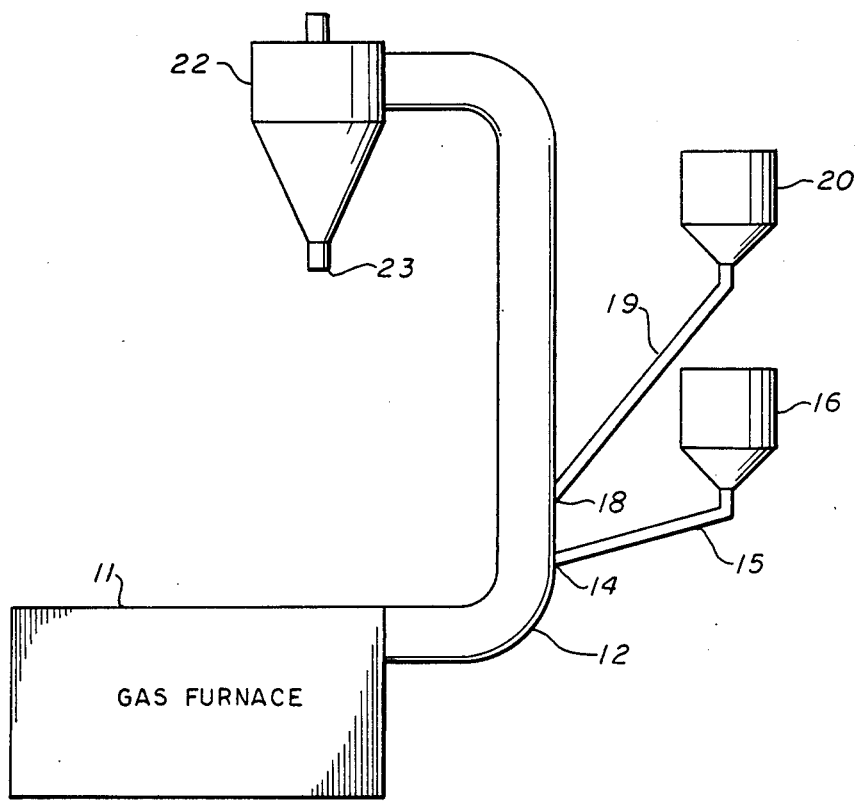

INSULATION MATERIAL

BACKGROUND OF THE INVENTION

A. FIELD OF THE INVENTION

The present invention relates to insulation material, and more particularly to an insulation material including a substantially homogeneous mixture of inorganic non-flammable fibrous material and discrete expanded silicate particles substantially homogeneously dispersed throughout the fibrous material.

B. DESCRIPTION OF THE PRIOR ART

Inorganic fibrous materials have long been used in the field of insulation. Typically, the inorganic fibrous materials include rock or mineral wools, which are formed by blowing a jet of steam through molten rock or slag, or glass wools. The insulation efficiency of the material, which is known as the R value of the material, is attributable not to the material itself, but to the air trapped among the fibres. In the extreme case, if the fibrous material were compacted such that there were no intersticial air, then the R value would be exceedingly low. At the other extreme, if the fibrous material were so loose as not to trap air, then convection currents of air could flow easily through the material, again making quite small the R value. Thus, there is a theoretical optimum density of the fibrous material.

When the fibrous material is applied, either in blown form or in mats, the optimum density is substantially achieved. However, with time, the fibrous material settles and compacts. The settlement occurs because of the weight of the material and is accelerated by vibrations, which are ever present. As the fibrous material settles, it traps less air and its R value decreases. In some cases, after a few years, the settlement may be so great as to reduce by as much as fifty percent the R value of the insulation.

In addition to using inorganic fibrous material as a loose fill or mat material, such fibrous material is used in wet spray applications. In wet spray, the fibrous material is mixed with a liquid adhesive and sprayed onto a wall or ceiling where it dries and forms an insulating layer. Again, the primary insulating effect is due to air trapped between and among the fibres within the adhesive. However, the force of the spray in applying the mixture of fibrous material and adhesive forces out substantially all of the air and, accordingly, the R value of wet sprayed inorganic fibre is less than optimum.

Alternative products to inorganic fibrous material have been developed. One such class of alternatives is expanded amorphous glass particles, including sodium silicate, perlite, zonalite, and vermiculite. One product that has been found to be useful is that formed by the process of U.S. Pat. No. 4,203,773. All such products are lightweight particles having substantial air entrapped therein. The particles are used primarily by covering a ceiling with a layer thereof. The expanded glass insulation materials have an R value substantially higher than that of inorganic fibrous materials and, due to their rigidity, have substantially no settlement with time. However, for equal R values, the area coverage of expanded particulate insulation materials is substantially less than that of inorganic fibrous insulation materials. Accordingly, while expanded particulate materials are more efficient insulators, their cost is substantially higher than inorganic fibrous materials.

Because the air is trapped within the expanded glass particles and not between and among the fibres of inorganic fibrous insulation materials, expanded glass particles would appear to be useful in wet spray applications. The adhesive would bond together the particles, but there would be no reduction in the amount of trapped air within the adhesive-particle mixture. However, wet spray applications of expanded particulate materials have not been entirely satisfactory. A substantial number of particles upon impact with the surface to be covered bounce, rather than stick. Thus, in wet spray applications of expanded particulate material, there is substantial waste.

It is therefore an object of the present invention to provide an improved insulation material that overcomes the shortcomings of the prior art. More specifically, it is an object of the present invention to provide an economical insulation material that has a high R value, good coverage, and substantially no tendency to settle. It is a further object of the present invention to provide an insulation material that is suitable for wet spray applications that provides good insulation value without waste.

SUMMARY OF THE INVENTION

Briefly stated, the foregoing and other objects and advantages of the present invention are achieved by forming a mixture of an inorganic non-flammable fibrous material consisting of loose fibres and discrete expanded glass particles substantially homogeneously dispersed among the fibres. The expanded glass particles, being rigid, structurally support the fibres and thus eliminate any tendency of the material to settle. Additionally, the mixture of the present invention has a higher R value than pure inorganic fibrous material, and in certain formulations, a higher R value than pure expanded glass.

DESCRIPTION OF THE DRAWING

The drawing is a schematic diagram of the preferred apparatus for forming the composition of the present invention.

DESCRIPTION OF THE PREFERRED EMBODIMENT

The insulation material of the present invention is a mechanical mixture of inorganic non-flammable fibrous material and expanded silicate particles substantially homogeneously dispersed throughout the fibrous material. The fibrous material may include any of various known inorganic fibrous materials, including rock or mineral wool, or glass fibre. In the preferred embodiment, the fibrous material is rock wool, which may be obtained inexpensively from steel mills. The expanded glass particles may include sodium silicate, perlite, zonalite, or vermiculite. In the preferred embodiment, the expanded glass may either be the lightweight silicate aggregate prepared in accordance with U.S. Pat. No. 4,203,773, or a boric acid free silicate glass aggregate of the type manufactured by Philadelphia Quartz Company.

The expanded silicate aggregate and rock wool are mixed together so as to form a substantially homogeneous mixture. The expanded silicate aggregate is of substantially the same density as the rock wool, and the quantity of expanded silicate aggregate that is added is sufficient to add structural support to the mixture. As will be discussed in greater detail in the examples provided hereinafter, a quantity of expanded silicate which comprises ten percent by weight of the total mixture is sufficient to make the mixture resistant to settling.

Referring now to the drawing, there is shown schematically a system for making the preferred embodiment of the mixture of the present invention. The system includes a furnace 11, which preferably is gas fired in order to make a clean flame. Furnace 11 has connected thereto a flue 12 through which a stream of hot combustion products flows. Flue 12 has therein a first inlet 14 which is connected by suitable feed means 15 to an aggregate hopper 16. Aggregate hopper 16 is adapted to receive and feed into flue 12 a metered amount of unexpanded silicate aggregate particles. Closely adjacent first inlet 14 is a second inlet 18 which is connected by suitable feed means 19 to a rock wool hopper 20 which is adapted to receive and feed at a metered rate rock wool. The rock wool and the unexpanded silicate aggregate are introduced into flue 12 and mixed together. The temperature of the flue gases is selected to be in a range higher than the temperature at which the silicate aggregate expands and lower than the melting point of the fibrous material. The aggregate prepared according to U.S. Pat. No. 4,203,773 has an expansion temperature of at least 425° C. and rock wool has a melting temperature in excess of 1100° C. Accordingly, in the preferred embodiment of the invention, the temperature of the flue gas is in the range of 425° C. to 1100° C. The hot flue gases carry the rock wool and unexpanded silicate aggregate upwardly and the heat within flue causes the unexpanded silicate aggregate to expand, thereby forming the mixture of the preferred embodiment. The mineral wool is also fluffed and cleaned during its travel upwardly through flue 12. The product is discharged from flue 12 through a cyclone separator 22, which cools and cleans the product of any lint or dust that may be therein. The product is discharged from cyclone 22 through an outlet 23 where it may be collected or bagged in any conventional manner.

The product of the present invention has utility either as a loose fill insulation material or as a wet spray. As a loose fill, the material is applied conventionally by blowing. As a wet spray, the product is mixed with an adhesive and sprayed in the "gunnite" process. The fibres of the material form together with the adhesive a matrix which holds in place the expanded silicate. The fibres in effect make the adhesive stickier, which causes the expanded silicate particles to stick to the surface to which the material is applied and not bounce off.

In order to understand better the present invention, the following specific examples are provided. In each example, the settled density and apparent thermal conductivity, which is the inverse of thermal resistance (R value), were measured.

Settled density was determined by making volume and weight measurements as described. The settled density was evaluated in accordance with Federal Specification HH-1-515D, and thermal conductivity and thermal resistance at the settled density were measured in accordance with ASTM C518-76.

In order to measure settle density, the sample material was poured into a holding box and any large clumps that might cause feeding problems were broken up. The material was then blown through a cyclone blower into a glass specimen container placed in the enclosed fill chamber of the blower, taking care to produce as level a surface as possible. After blowing, the container was removed, the surface gently screened smooth and level, and the weight and volume recorded. Careful attention was paid during handling to avoid jarring that might introduce settling. The container was then covered to prevent spilling and was secured to a shaker. The shaker was operated for a period five minutes, plus or minus fifteen seconds. The container was then removed from the shaker and uncovered, taking care not to bump or jar it, and a disk was lowered very slowly into the container until it started to contact the insulation. The disk was released and allowed to settle under its own weight. The volume occupied by the settled insulation was measured using the bottom edge of the disk as the upper datum point. If the disk was not level, the high and low points of the bottom of the disk were measured, and the readings were average. This average value was used as the height measurement in calculating the volume. The settled insulation volume and insulation weight were used to calculate settled density.

The specimens were then tested in accordance with ASTM C518-76, "steady-state thermal transmission properties by means of the heat flow meter". In preparation for testing at 24° C. (75° F.) the sample material was blown into a containment ring which was constructed of polystyrene foam with 1.5 mm (0.06") thick cardboard as a bottom surface. The thermal resistance of the carboard was determined to be 0.025 hr ft$^2$°F. per btu. The sample was placed between 300 mm square aluminum plates with blackened surfaces. The upper surface contained a heater, while the lower plate included a cooling chamber, a subsidiary heater, and a multi-junction thermopile calibrated heat meter at equilibrium conditions, the temperature of both hot and cold faces were evaluated from thermocouples embedded in the plates and the heat flux through the specimen was derived from the output of the heat meter.

EXAMPLE 1

A sample of material was prepared according to the present invention which comprised 90% by weight of rock wool obtained from Bethlehem Steel Corporation, and 10% by weight of DACOTHERM brand expanded silicate aggregate, which is the product prepared by the process of U.S. Pat. No. 4,203,773, obtained from Diamond Shamrock Corporation. The settled density of the material of Example 1 was 1.45 pcf, as compared to 1.29 pcf for pure rock wool. The measured R value of the sample of Example 1 was 2.91, as compared to 2.70 for pure mineral wool. Accordingly, the product of Example 1 exhibited an increase in settle density of approximately 12.4% and an increase in R value of approximately 7.7%, as compared to pure rock wool.

EXAMPLE 2

A sample of product was prepared according to the present invention, wherein substantially equal weights of rock wool and the DACOTHERM expanded silicate aggregate were combined. The settled density of the sample of Exhibit 2 was equal to 2.23 pcf. The R value of the sample of Example 2 was measured to be 3.45. Thus, the sample of Example 2 achieved an increase in settled density of approximately 73% and an increase in R value of approximately 30%, as compared to pure rock wool. At current prices for raw materials, it has been determined that the cost of providing equal R value to equal size houses with the sample of Example 2 is approximately half of what the cost would be with pure expanded silicate.

EXAMPLE 3

A sample was prepared according to the present invention which comprised 25% rock wool and 75% DACOTHERM expanded silicate aggregate. The settled density of the sample of Example 3 was 2.8 pcf, and the R value was 4.2. Thus, the settled density as compared to 100% rock wool was increased 93%, and the R was increased approximately 55.5%. It is interesting that 100% expanded silicate aggregate particles have a settled density of 3.0 pcf, and an R value of 4.0. Thus, the settled density of the sample of Example 3 is only 6.7% less than that of pure expanded aggregate particles, but the R value is actually 5% higher.

It should be understood by the reader hereof that the description of the invention herein is set forth for exemplary purposes only and that various changes and/or modifications may be made hereto without departing from the spirit and scope of the invention claimed hereafter.

What is claimed is:

1. An insulation material, which comprises:
    a quantity of inorganic non-flammable fibrous material consisting of loose fibers;
    and 10–75% by weight of discrete expanded silicate particles substantially homogeneously dispersed among said loose fibers throughout said fibrous material to form a substantially homogenous mixture adapted for use as a loose fill insulation material.

2. The insulation material as claimed in claim 1, wherein said fibrous material includes mineral wool.

3. The insulation material as claimed in claim 1, wherein said fibrous material includes glass fibers.

4. The insulation material as claimed in claim 1, wherein said fibrous material and said expanded silicate particles have substantially the same density.

5. A method of making an insulation material, which comprises the steps of:
    forming a substantially homogeneous mixture of a quantity of inorganic non-flammable fibrous material and a quantity of discrete unexpanded silicate particles;
    and heating the mixture to a temperature sufficient to expand the silicate particles without melting said fibrous material.

6. A method of making an insulation material comprising a substantially homogeneous mixture of loose inorganic non-flammable fibrous material and discrete particles of expanded silicate, which comprises the steps of:
    forming a stream of gas having a temperature higher than the expansion point of said expanded silicate and lower than the melting point of said fibrous material;
    injecting a quantity of discrete particles of unexpanded silicate into said stream of gas to be carried therewith;
    injecting a quantity of inorganic non-flammable fibrous material into said stream of gas such that said unexpanded silicate particles disperse among the fibers of said fibrous material to form a substantially homogeneous mixture therewith, whereby said mixture is carried with said stream of gas and said unexpanded silicate particles expand within said fibrous material.

7. The method of claim 6, wherein said fibrous material is rock wool.

* * * * *